United States Patent
Schoellner et al.

(10) Patent No.: US 11,681,107 B2
(45) Date of Patent: Jun. 20, 2023

(54) FIBER OPTIC FERRULE AND METHOD FOR TERMINATING A FIBER OPTIC FERRULE TO PREVENT DELAMINATION

(71) Applicant: US Conec, Ltd, Hickory, NC (US)

(72) Inventors: Dirk E. Schoellner, Hickory, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/212,856

(22) Filed: Mar. 25, 2021

(65) Prior Publication Data

US 2021/0302662 A1 Sep. 30, 2021

Related U.S. Application Data

(60) Provisional application No. 63/000,205, filed on Mar. 26, 2020.

(51) Int. Cl.
*G02B 6/38* (2006.01)
*G02B 6/44* (2006.01)

(52) U.S. Cl.
CPC ......... *G02B 6/3849* (2013.01); *G02B 6/3825* (2013.01); *G02B 6/3869* (2013.01); *G02B 6/4471* (2013.01)

(58) Field of Classification Search
CPC .................................................. G02B 6/3849
See application file for complete search history.

(56) References Cited

U.S. PATENT DOCUMENTS

| 6,733,190 | B2 * | 5/2004 | Kuhara | G02B 6/29398 |
| | | | | 385/94 |
| 7,510,337 | B2 * | 3/2009 | Takeda | G02B 6/3885 |
| | | | | 385/86 |
| 2020/0257061 | A1 | 8/2020 | Holmquist | |

\* cited by examiner

*Primary Examiner* — Sung H Pak
(74) *Attorney, Agent, or Firm* — Michael L Leetzow PLLC; Shubhrangshu Sengupta

(57) ABSTRACT

A method for terminating a fiber optic ferrule included applying a force to a fiber optic ferrule while simultaneously holding the optical fibers. The fiber optic ferrule uses epoxy to hold the optical fibers, the epoxy can be either heat or light cured. The force is applied through a pusher that engages a cap on the front end of the fiber optic ferrule.

20 Claims, 8 Drawing Sheets

FIBER OPTIC FERRULE AND METHOD FOR TERMINATING A FIBER OPTIC FERRULE TO PREVENT DELAMINATION

REFERENCE TO RELATED CASE

This application claims priority under 35 U.S.C. § 119 (e) to U.S. provisional application No. 63/000,205 filed on Mar. 26, 2020, the contents of which are hereby incorporated by reference in their entirety.

BACKGROUND OF THE INVENTION

Fiber optic ferrules are terminated with one or more optical fibers. The terminated fiber optic ferrules may then be connectorized or used without connector housings, depending upon the fiber optic ferrule and its application. Certain steps are typically followed to properly position the optical fibers inside the fiber optic ferrules in a secure manner. Such ferrules may be made of optically transparent/ clear material (e.g., the PRIZM® MT ferrule by the Applicant) or may be opaque (e.g., a regular MT ferrule).

For certain fiber optic ferrules, one or more optical fibers are attached using an epoxy or adhesive added into the main body of the fiber optic ferrule through an epoxy window of the fiber optic ferrule. The optical fibers are then placed on/in the ferrule, depending on the fiber supporting structures present in the ferrule (e.g., fiber openings, V-grooves, U-grooves, etc.). The assembly of the fiber optic ferrule, the fibers, and the epoxy is temperature cured in an oven, hardening the epoxy to secure the optical fibers within the fiber optic ferrule. During heating, and prior to curing, the epoxy is in a liquid state and flows between the optical fibers and the opening/structure into which the optical fibers are placed in inside the fiber optic ferrule. As the temperature approaches the curing temperature, typically around 75° C., the epoxy solidifies and anchors the optical fibers securely to the fiber optic ferrule. The strongest bond between the optical fibers and the fiber optic ferrule is due to the solidified epoxy typically present at the fiber supporting structure.

Typically, there is a mismatch in the coefficient of thermal expansion (CTE) between the epoxy material, the material of the fiber optic ferrule and the material of the optical fiber (glass). The optical fiber has a CTE of about 0.5 ppm/° C., the ferrule has a CTE of about 60 ppm/° C., and the epoxy has a CTE of about 100 ppm/° C. As a result of the different CTEs, these materials expand and contract differently during heating and cooling. Optical fibers must be positioned precisely relative to internal surfaces of the fiber optic ferrule to ensure they meet the tolerances for optical losses. The different CTEs and movement of the materials during heating and subsequent cooling may cause air gaps or delamination at different locations inside the fiber optic ferrule, e.g., between the optical fiber tips and the fiber optic ferrule internal surfaces, such as at the fiber optic ferrule internal wall. See, e.g., FIG. 1.

As discussed, the fiber optic ferrule 10 and optical fiber 12 shown in FIG. 1 have the best bond in the fiber opening or hole 14. For any subsequent heating that may occur, the optical fiber 12 does not move axially along the fiber opening 16. For example, the fiber optic ferrule 10 may be inside a chassis that has a higher ambient temperature than the temperature at which the epoxy was cured. During subsequent heating, the fiber optic ferrule internal wall 18, shown in FIG. 1, moves away (expands) from the tip of the optical fiber 12 and this expansion can cause the epoxy bond to fail, causing delamination between the optical fiber 12 and the internal wall 18. To reduce the likelihood of delamination, there is a limit on the magnitude of this movement. This also means that there is a limit on the eventual operating temperature of the connector to avoid the delamination. Any delamination may cause an added reflection that can create issues with optical performance.

Thus, there is a need for a process and a fiber optic connector that is assembled taking into account the force encountered in the fiber optic ferrule, optical fiber, and the epoxy during and after a curing process of the ferrule to prevent any creation of air gaps in the path of the optical beams transported by the terminated fiber optic ferrule.

SUMMARY OF THE INVENTION

The present invention is directed to a method to prevent epoxy delamination in a fiber optic ferrule having optical fibers, that includes inserting optical fibers and epoxy into the fiber optic ferrule, applying an external force to the fiber optic ferrule, said applied external force being greater than a force resulting from a thermal expansion of the fiber optic ferrule, the optical fibers, and epoxy, and curing the epoxy while maintaining the application of the external force to the fiber optic ferrule.

In some embodiments, the applied external force causes a compressive force the between the optical fibers and a fiber stop plane in the fiber optic ferrule.

In some embodiments, the curing is carried out while applying the external force to the fiber optic ferrule.

In some embodiments, the externally applied force is applied to the fiber optic ferrule through a cap to prevent any damage to the fiber optic ferrule.

In some embodiments, the cap compressively engages a resilient member to provide the externally applied force to the fiber optic ferrule.

In yet another aspect, there is a method to prevent epoxy delamination in a fiber optic ferrule having optical fibers that includes inserting optical fibers into the fiber optic ferrule. pre-heating the fiber optic ferrule, adding the epoxy around the optical fibers in the fiber optic ferrule, and curing the epoxy using light to initiate the curing process.

In some embodiments, the pre-heating step is performed before the step of inserting the optical fibers.

In some embodiments, the method further includes applying an external force to the fiber optic ferrule.

In yet another aspect, there is a fiber optic ferrule having an internal compressive force between at least two of the fiber optic ferrule, optical fibers, and epoxy, the fiber optic ferrule made by the steps that include inserting the optical fibers and the epoxy into the fiber optic ferrule, applying an external force to the fiber optic ferrule, said applied external force being greater than a force resulting from a thermal expansion of the fiber optic ferrule, the optical fibers, and epoxy, and curing the epoxy while maintaining the application of the external force to the fiber optic ferrule.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
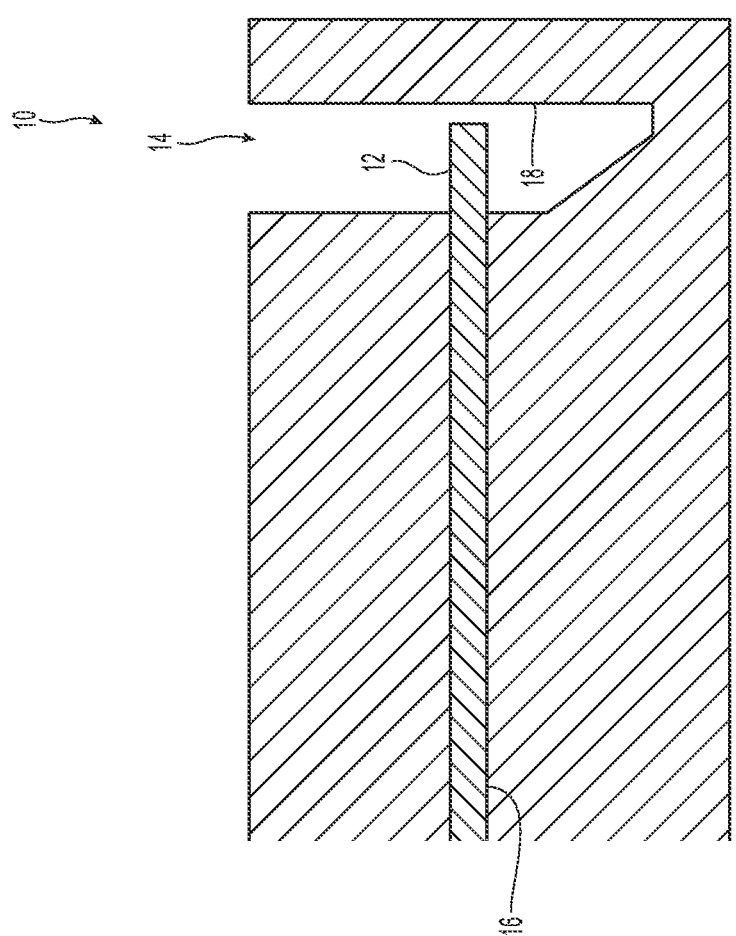
FIG. 1 is a cross section view of a fiber optic ferrule showing the optical fiber in relation to the internal structures of the fiber optic ferrule.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
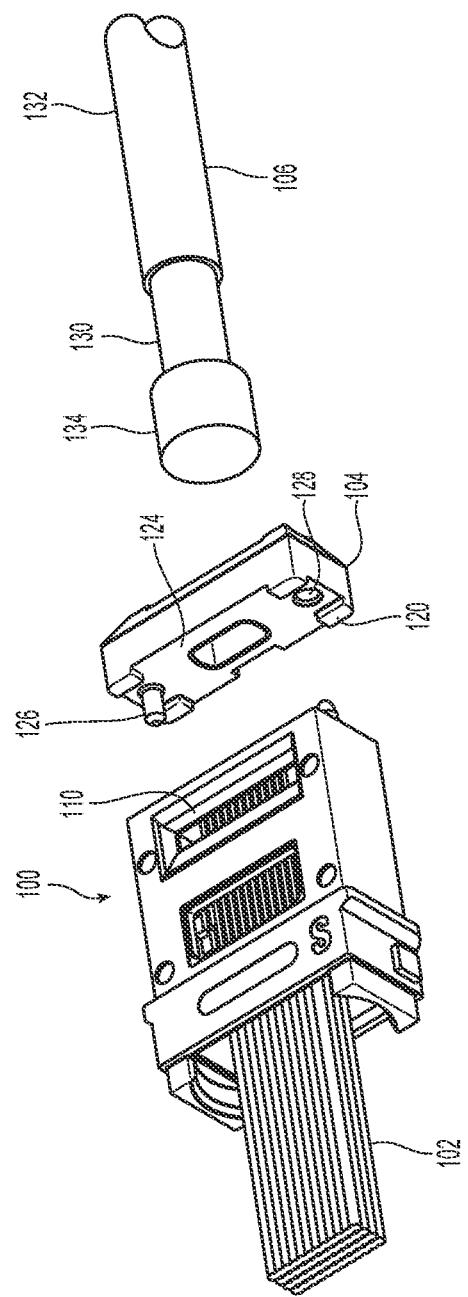
FIG. 2 is a perspective view a fiber optic ferrule with optical fibers inserted therein with a cap and pusher containing a resilient member.
Figure 3:
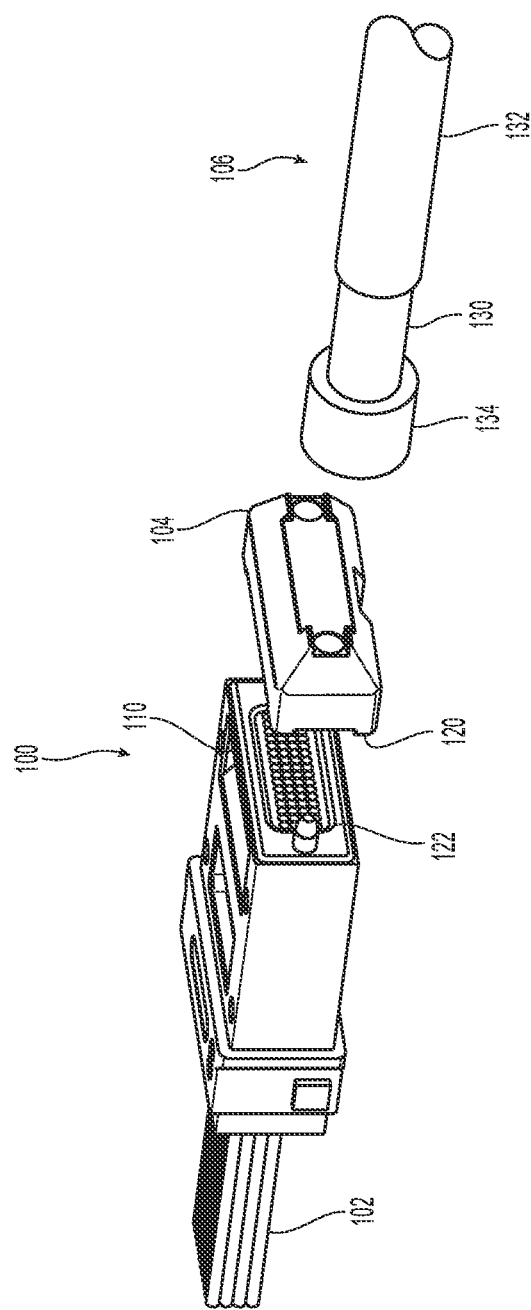
FIG. 3 is another perspective view of the fiber optic ferrule with optical fibers inserted therein with a cap and pusher containing a resilient member in FIG. 2.
Figure 4:
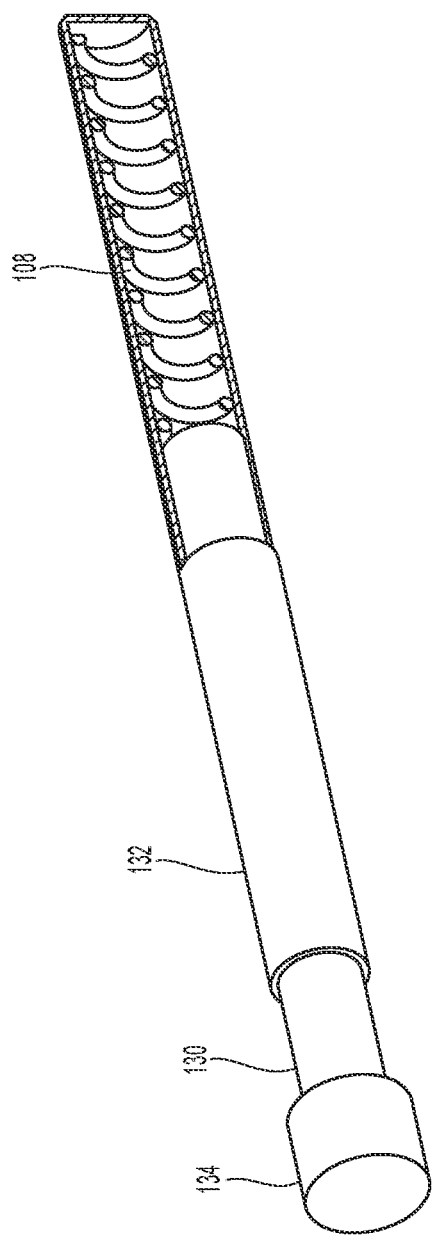
FIG. 4 is perspective view pusher containing a resilient member in FIG. 3.

As illustrated in FIGS. 2-4, there is a fiber optic ferrule 100 with optical fibers 102 inserted into the fiber optic ferrule 100. A cap 104 is disposed between the fiber optic ferrule 100 and a pusher 106 that contains a resilient element 108 (see FIG. 4). The pusher 106 provides a compressive force on the fiber optic ferrule 100 as discussed in detail below. This compressive force translates to an internal compressive force between two or more of the fiber optic ferrules 100, the optical fibers 102 and the epoxy applied.

Figure 8:
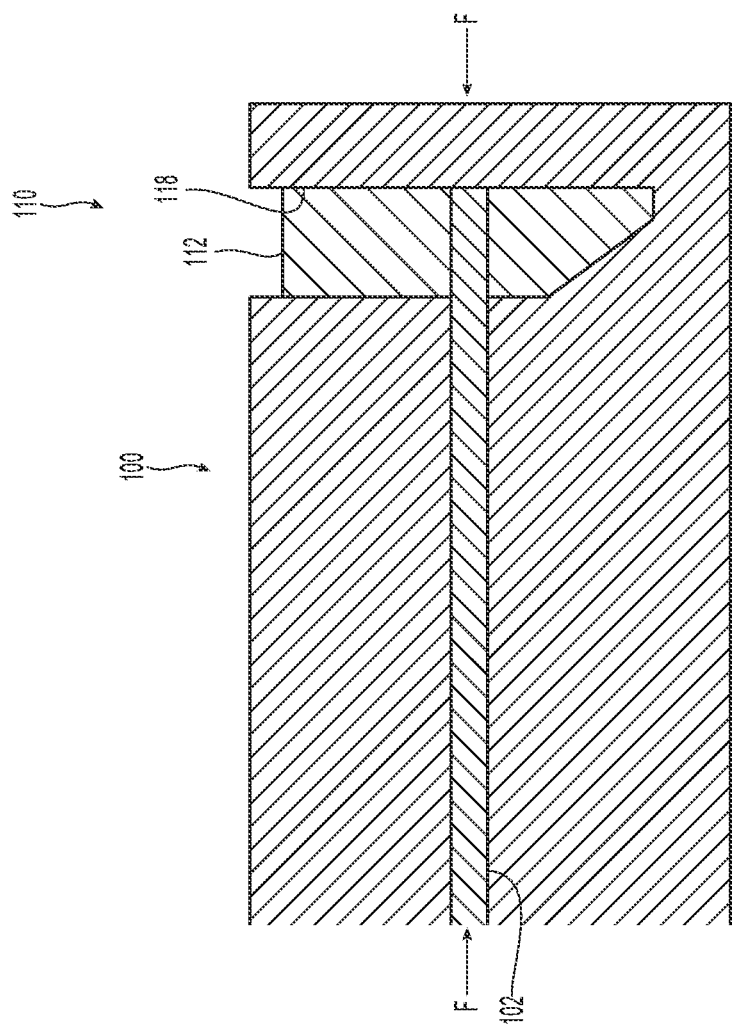
FIG. 8 is a cross section of one embodiment of a fiber optic ferrule according the present invention.

The fiber optic ferrule 100 is illustrated as an MT fiber optic ferrule, but could have other configurations, so long as the optical fibers 102 are terminated at or within the fiber optic ferrule 100. The size (or diameter) of the optical fibers 102 is not critical for this disclosure, and the techniques described herein are applicable to a variety of optical fiber types (single mode, multi-mode, single core or multi-core, and combinations thereof). Fiber optic ferrule 100 preferably has a fiber opening 110 toward the front of the fiber optic ferrule 100 to receive epoxy 112 therein. The fiber optic ferrule 100 may receive a number of optical fibers 102 in any format, included loose optical fibers, optical fiber ribbons (as illustrated), etc. There may also be more than one row of optical fibers 102, with each row spanning, for example, either 12 or 16 optical fibers 102. Only one optical fiber optical fiber 102 is illustrated in FIG. 8, the remaining structures in the fiber optic ferrule 100 (other optical fiber supporting structures, lenses, etc.) having been removed for clarity.

The cap 104 preferably has a number of rearward facing projections 120 that engage a front face 122 of the fiber optic ferrule 100. The rearward facing projections 120 should not engage the front face 122 of the fiber optic ferrule 100 where the light from the optical fibers 102 exits that fiber optic ferrule 100. If this were to happen, then the front face 122 of the fiber optic ferrule 100 may be scratched, damaged, or have debris that interferes with the emission or reception of the light traveling in the optical fibers 102. The rearward facing projections 120 could be in different places on the cap 104 and still fall within the scope of the present invention. The cap 104 is to transfer force from the pusher 106 to the fiber optic ferrule 100 and eventually to optical fibers 102. The cap 104 also has a rear face 124 that includes structures for engaging the fiber optic ferrule 100 and keeping the two components paired to one another. Preferably the rear face 124 has one projection 126 and one hole 128, which really functions as a guide pin hole. This hermaphroditic configuration matches to the typical configuration of the face of the fiber optic ferrule 100. However, the cap 104 could have any configuration that corresponds to the face of the fiber optic ferrule 100, i.e., two projections, two holes, etc.

The pusher 106 has a first portion 130 that cooperates with a second portion 132 to allow for expansion and contraction of the pusher 106. As best illustrated in FIG. 4, the first portion 130 slides within the second portion 132, although it could be reversed. Disposed within the second portion 132 is the resilient member 108, which is a spiral spring that allows for the relative movement of the first portion 130 and second portion 132. However, the resilient element 108 could be any number of different resilient elements and still come within the scope of the present invention. The pusher 106 also has a head portion 134 to engage the cap 104. The head portion 134 may take any number of forms, but is illustrated as a round cap in the figures. The head portion 134 may have a configuration that more closely engages the structures on the cap 104 if so desired. The resilient member 108 is selected so as to allow the pusher 106 to exert a force that may be around at least 0.25 N per optical fiber 102, and preferably approximately 1.0 N per optical fiber 102.

Figure 5:
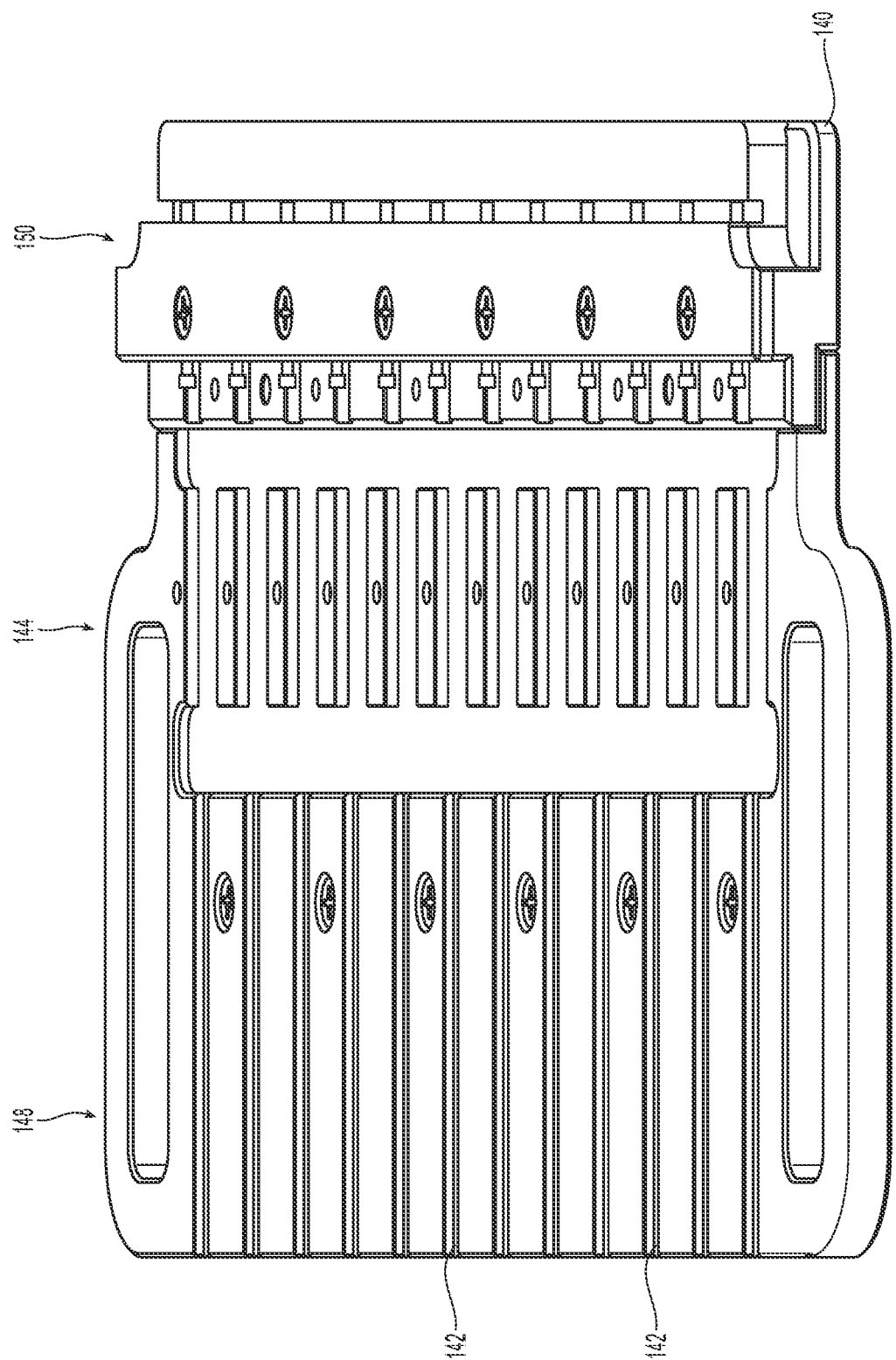
FIG. 5 is a curing tray used with the fiber optic ferrule, cap, and pusher in FIGS. 2 and 3.
Figure 6:
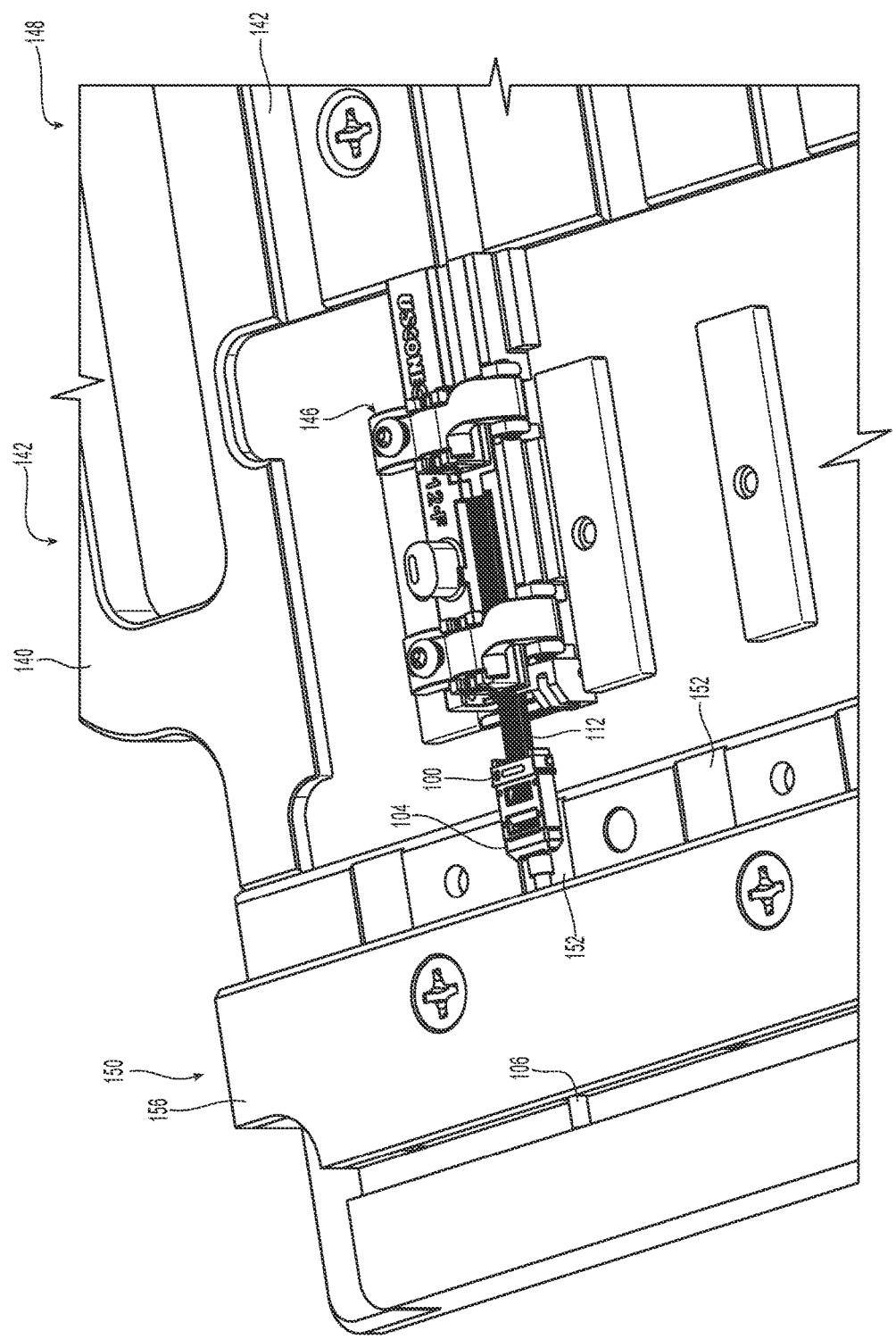
FIG. 6 is a perspective view of a portion of the curing tray with a clamping tool to hold the relative positions of the optical fibers.
Figure 7:
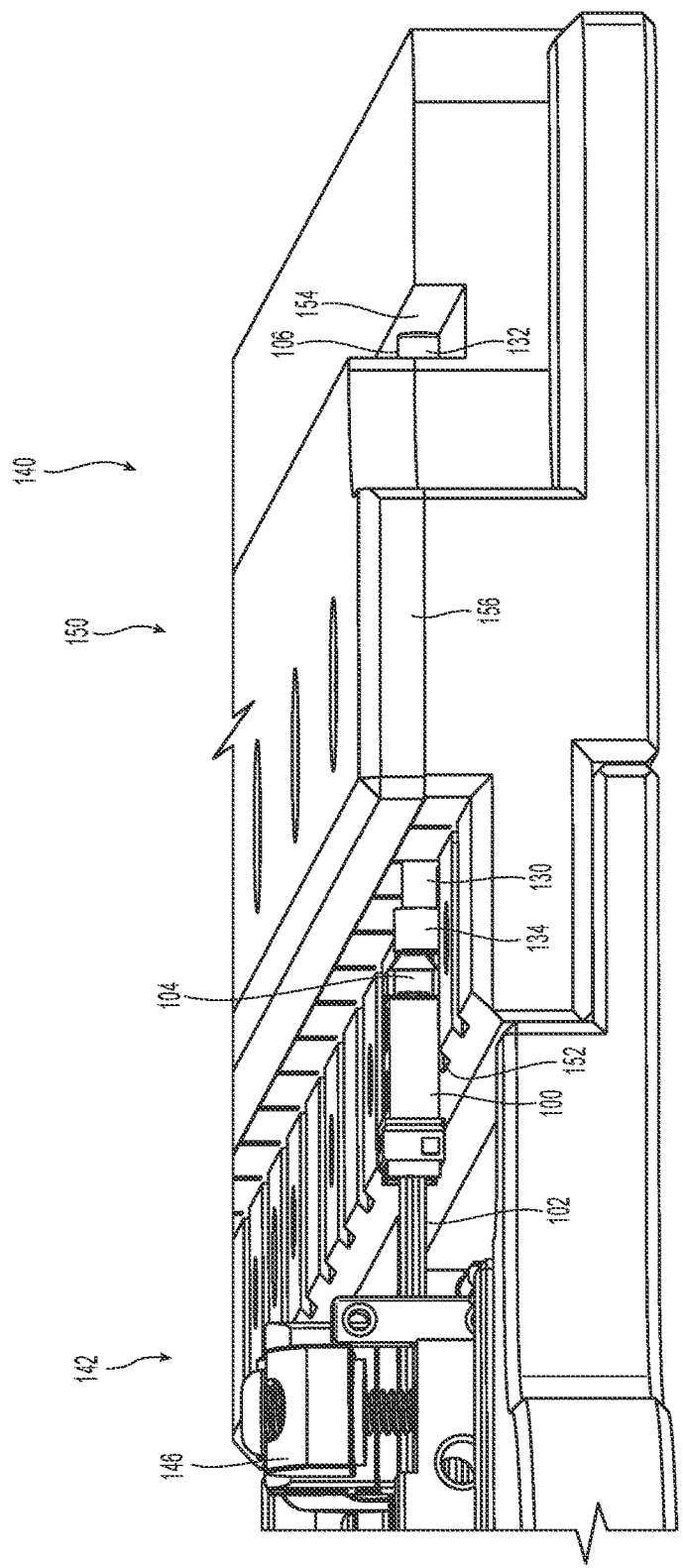
FIG. 7 is a perspective view from the side of the curing tray and clamping tool.

To allow for the pusher 106 to apply force to the fiber optic ferrule 100, there is preferably a curing tray (or tray) 140 to hold the components in relation to one another. Such a tray 140 is illustrated in FIGS. 5-7. The tray 140 has a number of slots 142 to hold a number of sets of components. In practice, each of the slots 142 is populated during production. Only one slot 142 is populated in FIGS. 6 and 7 for clarity purposes.

The tray 140 has a middle section 144 to receive an optical fiber clamp 146, a rear section 148 to manage and support the optical fibers 102 and a front section 150 to receive the fiber optic ferrule 100 and the pusher 106. In one method of arranging the components, the optical fibers 102 are disposed appropriately in the fiber optic ferrule 100. The optical fibers 102 are disposed within the optical fiber clamp 146, and the fiber optic ferrule 100 is placed in a fiber optic ferrule slot 152. The cap 104 is placed on the fiber optic ferrule 100 and the pusher 106 is aligned with the cap 104 at one end and a stop surface 154 in the front section 150 of the tray 140 at the other end. See FIGS. 6 and 7. There may be a cover 156 on the front section 150 to keep the pusher 106 engaged with the cap 104 and the fiber optic ferrule 100. The optical fibers 102 are clamped down in the optical fiber clamp 146. Thus, the pusher 106 pushes the cap 104 on the fiber optic ferrule 100, which pushes the fiber optic ferrule 100 against the ends of the optical fibers 102 disposed within the fiber optic ferrule 100. As noted above, the force applied to the fiber optic ferrule 100 from the pusher 106 is between 0.25 N and 1.0 N on each optical fiber 102. Epoxy is disposed within the fiber optic ferrule 100 at least through the opening 110 at any appropriate time. That is, the epoxy may be added before or after the optical fibers 102 are inserted into the fiber optic ferrule 100 and before or after the fiber optic ferrule 100 is place on the tray 140. The tray 140 with the components is then subjected to curing of the epoxy.

There are generally two types of epoxy, heat-cured and UV light-cured. If the epoxy is of a heat-curable type, the tray 140 is put into a curing oven, and the temperature of the curing is preferably above the temperature where the fiber optic ferrule 100 will be used, generally about 85° C. Thus, when the fiber optic ferrule 100 is heated in its typical operational environment, the fiber optic ferrule 100 will be able to withstand the heat and not cause any undesirable separation of the epoxy from the fiber optic ferrule 100 or the optical fibers 102. Heating of the fiber optic ferrule 100 may not always occur.

If the epoxy is the UV light-curable type, then the fiber optic ferrule 100 and the optical fibers 102 may be heated prior (pre-heating) to curing with the UV light source. The pre-heating step may be performed before inserting the optical fibers 102, or with the optical fibers 102 inserted. Again, this would reduce any undesirable separation of the epoxy from the fiber optic ferrule 100 or the optical fibers 102.

The forces applied to the fiber optic ferrule 100 is illustrated FIG. 8 by the arrows F. While the optical fibers 102 are illustrated abutting the ferrule internal wall 118 in FIG. 8, the ferrule internal wall 118 may have individual portions (holes) cut thereinto to rest the tips of the optical fibers 102 thereupon. Alternatively, there may other configurations that allow for the optical fibers 102 to engage a flat surface, such as a plurality of flat surfaces. Such portions of the ferrule internal wall 118 will be then provided facing each of the respective optical fibers 102. The force F from the front is applied to the fiber optic ferrule 100 by the pusher 106 through the cap 104. The force F from the rear is applied by the optical fiber clamp 146 by holding the optical fibers 102 tightly and not allowing them to move during the curing process. The applied external force F causes an internal compressive force between the optical fibers 102 and the ferrule internal wall 118. When the ferrule internal wall 118 has respective holes facing an end-face of each of the optical fibers 102—different from the fiber openings 14 and 110—the internal compressive force is present between the optical fibers 102 and the respective ferrule internal wall 118 inside each of the holes. The fiber optic ferrule 100 is terminated with the inserted optical fibers 102 and the epoxy such that the applied external force F is greater than a force resulting from a thermal expansion of the fiber optic ferrule 100, the optical fibers 102, and epoxy. The epoxy is then cured while maintaining the application of the external force to the fiber optic ferrule. As a result, no air gaps in the epoxy occur (i.e., no delamination of the epoxy occurs).

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A method to prevent epoxy delamination in a fiber optic ferrule having optical fibers, comprising:
    inserting optical fibers and epoxy into the fiber optic ferrule;
    applying an external force to the fiber optic ferrule, said applied external force being greater than a force resulting from a thermal expansion of the fiber optic ferrule, the optical fibers, and epoxy; and
    curing the epoxy while maintaining the application of the external force to the fiber optic ferrule.

2. The method according to claim 1, wherein the applied external force causes a compressive force between the optical fibers and a respective ferrule internal wall.

3. The method of claim 1, wherein the curing is carried out while applying the external force to the fiber optic ferrule.

4. The method according to claim 1, wherein the force is a compressive force.

5. The method according to claim 1, wherein the externally applied force is applied to the fiber optic ferrule through a cap to prevent any damage to the fiber optic ferrule.

6. The method according to claim 5, wherein the cap has at least one projection to engage a guide pin hole on the fiber optic ferrule.

7. The method according to claim 5, wherein the cap compressively engages a resilient member to provide the externally applied force to the fiber optic ferrule.

8. The method of claim 1, wherein the applied external force is greater than 0.25 N per optical fiber inserted into the fiber optic ferrule.

9. A method to prevent epoxy delamination in a fiber optic ferrule having optical fibers, comprising: inserting optical fibers into the fiber optic ferrule; pre-heating the fiber optic ferrule before adding any epoxy into the fiber optic ferrule; adding the epoxy around the optical fibers in the fiber optic ferrule; and curing the epoxy using light to initiate the curing process.

10. The method according to claim 9, wherein the pre-heating step is performed before the step of inserting the optical fibers.

11. The method according to claim 9, further comprising applying an external force to the fiber optic ferrule.

12. The method according to claim 11, wherein the applied external force causes a compressive force between the optical fibers and a fiber stop plane in the fiber optic ferrule.

13. The method according to claim 9, wherein the curing is carried out while applying an external force to the fiber optic ferrule.

14. The method according to claim 11, wherein the externally applied force is applied to the fiber optic ferrule through a cap to prevent any damage to the fiber optic ferrule.

15. The method according to claim 14, wherein the cap has at least one projection to engage a guide pin hole on the fiber optic ferrule.

16. The method according to claim 14, wherein the cap compressively engages a resilient member to provide the externally applied force to the fiber optic ferrule.

17. The method according to claim 11, wherein the applied external force is greater than 0.25 N per optical fiber inserted into the fiber optic ferrule.

18. A fiber optic ferrule produced by the method in claim 1.

19. A fiber optic ferrule produced by the method in claim 9.

20. A fiber optic ferrule having an internal compressive force between at least two of the fiber optic ferrule, optical fibers, and epoxy, the fiber optic ferrule terminated by the steps comprising:
    inserting the optical fibers and the epoxy into the fiber optic ferrule;

applying an external force to the fiber optic ferrule, said applied external force being greater than a force resulting from a thermal expansion of the fiber optic ferrule, the optical fibers, and epoxy; and curing the epoxy while maintaining the application of the external force to the fiber optic ferrule.

* * * * *